UNITED STATES PATENT OFFICE.

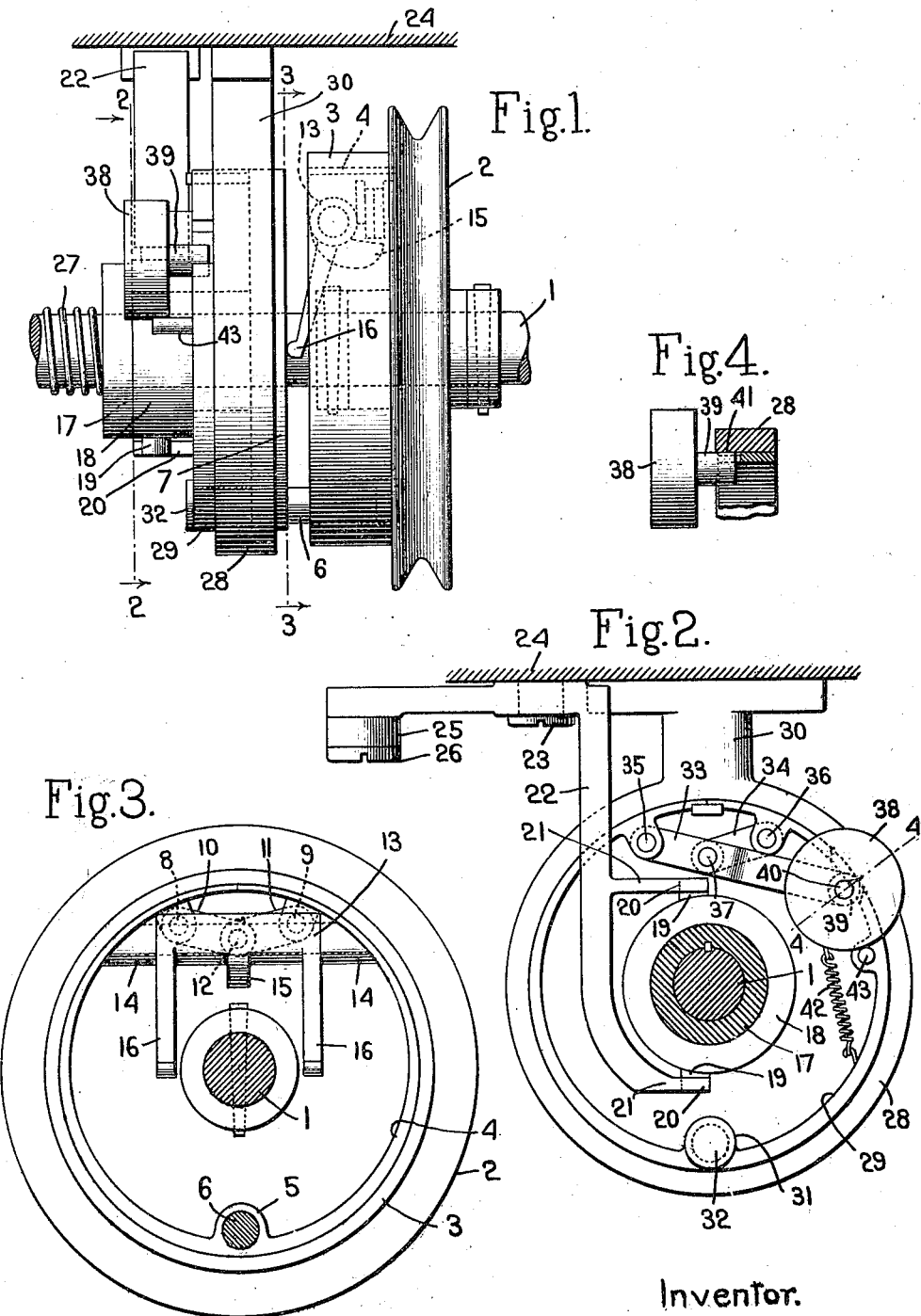

FRANKLIN A. REECE, OF HOPKINTON, MASSACHUSETTS, ASSIGNOR TO THE REECE BUTTON HOLE MACHINE COMPANY, OF BOSTON, MASSACHUSETTS, A CORPORATION OF MAINE.

STOP-MOTION.

1,244,079.

Specification of Letters Patent. Patented Oct. 23, 1917.

Application filed February 8, 1917. Serial No. 147,276.

*To all whom it may concern:*

Be it known that I, FRANKLIN A. REECE, a citizen of the United States, residing at Hopkinton, county of Middlesex, State of Massachusetts, have invented an Improvement in Stop-Motions, of which the following description, in connection with the accompanying drawing, is a specification, like characters on the drawing representing like parts.

This invention relates to stop motions and has for its object to provide a novel stop motion including a clutch for operating a driven element and a braking device to stop the driven element when the clutch is disconnected, and which braking device is constructed to apply a variable braking action, depending on the speed of rotation of the driven element when the clutch is disengaged. In many stop motions, a brake is provided for retarding the driven element and bringing it to rest when the clutch is disengaged, but usually the brake device is constructed to apply the same braking effect, regardless of the speed of rotation of the driven element. The result is that if the driven element is rotating very rapidly when the brake is applied, the brake will have less effect in bringing the driven member to rest during the rotation of the driven element through a predetermined angle than it has when the driven element is rotating at a relatively slow rate of speed. By my invention, I provide a novel braking device which is so constructed that the braking friction which is applied when the clutch is disengaged will be proportional to the speed of rotation with the result that the proper amount of braking action will take place at each disengagement of the clutch to bring the driven part to rest at the proper point, regardless of the speed of rotation.

My improvement also involves a novel friction clutch and other features which will be more fully hereinafter described.

In order to give an understanding of my invention, I have illustrated in the drawings a selected embodiment thereof which will now be described, after which the novel features will be pointed out in the appended claims.

Figure 1 is a side view of a stop motion embodying my invention;

Fig. 2 is a section on the line 2—2, Fig. 1;
Fig. 3 is a section on the line 3—3, Fig. 1;
Fig. 4 is a section on the line 4—4, Fig. 2.

1 indicates the driven element which is herein illustrated as a shaft. The driving member of the clutch is indicated generally at 2 and is in the form of a belt pulley loosely mounted on the shaft and provided with a laterally-extending clutch flange 3 that encircles the driven clutch member which is in the form of an inside expanding clutch 4. This inside expanding clutch is of the familiar split-ring type which can be expanded into frictional engagement with the interior of the flange 3 when the clutch is to be engaged or can be contracted to release its frictional engagement with the flange 3 when the clutch is to be disengaged. The driven clutch member 4 is shown as provided with a hub 5 which is carried on a pin 6 extending from a clutch-actuating disk 7 that is splined to the driven shaft 1, but capable of movement longitudinally thereof. The driven clutch element 4 and the disk 7 are, therefore, connected so that they will rotate in unison.

For expanding the clutch element 4 into operative engagement with the clutch flange 3, I have provided a toggle lever device which is actuated by the movement of the disk 7 longitudinally of the shaft. The two arms of the split expanding clutch member 4 have two links 10 and 11 pivoted thereto at 8 and 9, respectively, said two links being pivotally connected together at 12, thus forming a toggle-lever device. These links are of such a length that when the clutch is disengaged, they have an angular relation to each other, as shown in Fig. 3. By forcing the connecting ends of the links outwardly in a direction tending to straighten the toggle lever, the clutch 4 will be expanded into frictional engagement with the flange 3. For thus operating the toggle lever, I have provided a rock-shaft 13 which is journaled in bosses 14 carried by the two sides of the expanding clutch 4, said rock shaft having a finger or projection 15 extending therefrom and situated beneath the pivotal joint of the members 10 and 11. The rock shaft also has two arms 16 rigid therewith which are situated either side of the shaft 1, said arms being constructed to bear against the face of the disk 7. When the clutch-actuating disk 7 is moved to the right, Fig. 1, the rock-shaft 13 will be turned thereby bringing the finger 15 against the toggle lever and tending to straighten the latter. This will expand the clutch and bring the two clutch members into operative engagement. Movement of the disk 7 to the left, Fig. 2, will release the clutch. Any suitable means may be employed for moving the disk 7 longitudinally of the shaft 1. As herein shown, said disk is provided with a hub having a flange 17 on which is loosely mounted a collar 18 that engages said flange. This collar is provided with two oppositely-disposed projections 19 that are engaged by the forked ends 20 of two arms 21 extending from a clutch actuator 22. This clutch actuator is shown as pivotally mounted at 23 to any suitable fixed support 24 and may be operated by any suitable lever or other connection 25 pivoted thereto at 26. The clutch actuator 22 may be utilized for moving the disk 7 longitudinally of the shaft in both directions, or, if desired, said clutch actuator may be used for merely disengaging the the clutch, and a spring 27 surrounding the shaft 1 and bearing against the hub may be used for throwing the clutch into engagement.

My improved mechanism for bringing the driven element to rest when the clutch is disengaged comprises a stationary brake band 28 and an inside expanding brake 29 situated within the brake band 28 and adapted to have frictional engagement therewith. The fixed brake band 28 is shown as in the form of a non-yielding ring which depends from and is rigid with a bracket 30 that may be secured to the fixed support 24. The inside expanding brake 29 is in the form of a split ring and is provided with a hub 31 that is mounted on a pin 32 extending from the disk 7.

The two sides of the expanding brake 29 have two links 33 and 34 pivoted thereto at 35 and 36, respectively, and these two links are pivoted together at 37, thus forming a toggle joint. The link 33 is extended beyond the pivot 37 and it carries a weight 38 on the outer end thereof. Since the expanding brake 29 is connected with the disk 7, it will be seen that the brake element will rotate with the disk 7. During the rotation of the disk 7. the centrifugal action on the weight 38 will tend to make it fly outwardly and such outward movement will expand the brake.

I have provided herein means for preventing the outward movement of the weight 38 due to centrifugal action while the clutch is in engagement, said means becoming inoperative the instant that the clutch is disengaged. As soon as the clutch is disengaged, therefore, the weight 38 will fly outwardly by centrifugal action, thus applying the brake 29. The force with which the brake is applied will depend upon the speed of rotation of the driven element at the time that the clutch is disengaged, and, therefore, a braking action which is proportional to the speed of rotation of the driven element will always be produced as soon as the clutch is disengaged.

While any suitable means for holding the centrifugal weight 38 inoperative while the clutch is engaged may be employed, I have herein illustrated a simple construction which comprises a roll 39 journaled on a stud 40 projecting laterally from the weight 38. The roll is of sufficient length so that when the clutch disk 7 is moved to the right in Fig. 1 to throw the clutch into engagement, said roll will overlie the inside edge 41 of the brake band 28. The centrifugal weight 38 is acted upon by a spring 42 which normally draws it inwardly against the stop 43, as seen in Fig. 2, this being the position of the parts when the driven element is at rest, and when the brake is inoperative. When in this position the roll 40 is at a radial distance from the axis of rotation slightly less than that of the inside face 41 of the brake band 28 so that when the disk 7 is moved to the right, Fig. 1, to throw the clutch into engagement, the end of the roll 39 will be carried within the brake band 28, as shown in Fig. 4. This movement of the clutch disk 7 to the right will throw the clutch into engagement, and the driven element will be set in rotation. As soon as the driven element starts rotating, the centrifugal force acting on the weight 38 will hold the roll 39 against the portion 41 of the brake band, and the brake band will thus act as a stop to prevent the centrifugal weight from being thrown outward sufficiently to render the brake operative. The brake will thus be held inoperative so long as the clutch is engaged. When the brake disk 7 is moved to the left, Fig. 1, to disengage the clutch, such movement will withdraw the roll 29 from the brake band 28, thus allowing the weight 38 to be thrown outwardly by centrifugal action thereby applying the brake.

I claim:

1. In a stop motion, the combination with a driven element, of a clutch for driving said element, means to cause said clutch to be engaged and disengaged, a brake comprising a stationary brake band, an internal expanding brake member rotating with the driven element and coöperating with said brake band, and automatically-operative means to expand said brake member when the clutch is disengaged.

2. In a stop motion, the combination with a driven element, of a clutch for driving said element, means to cause said clutch to be engaged and disengaged, a brake comprising a stationary brake band, an internal expanding brake member rotating with the driven element and coöperating with said brake band, a centrifugal device to expand the brake member, and means to hold said centrifugal device inoperative while the clutch is engaged.

3. In a stop motion, the combination with a driven member, of a clutch for driving said member, means to cause said clutch to be engaged and disengaged, a brake comprising a stationary brake band, an internal expanding brake member rotating with the driven member and coöperating with said brake band, a toggle device connecting the free ends of said brake member, a centrifugal weight connected to said toggle to apply the brake when the weight is subjected to centrifugal force, and means to hold the brake inoperative while the clutch is engaged and to permit the centrifugal weight to operate by centrifugal force when the clutch is disengaged.

4. In a stop motion, the combination with a driven shaft, of a clutch for driving said shaft, a disk movable longitudinally of the shaft and by which the clutch is controlled, a stationary brake band encircling the disk, an expanding brake carried by the disk and coöperating with said brake band, a toggle lever connection between the ends of said brake, a centrifugal weight connected to said toggle lever, and a projection extending from said weight and adapted to have engagement with the interior of the brake band when the clutch is engaged whereby the centrifugal weight is held inoperative, said projection being released from the brake band when the clutch is disengaged thereby allowing the centrifugal weight to become operative to apply the brake.

5. In a stop motion, the combination with a driven element, of a clutch for driving said element, means to cause said clutch to be engaged and disengaged, a brake comprising a stationary annular brake member, an internal expanding brake member situated within the stationary brake member and rotating with the driven element, and means to expand said expanding brake member into frictional contact with the stationary brake member when the clutch is disengaged, said means operating with a greater or less force depending on the speed of rotation of the driven element.

6. In a stop motion, the combination with a driven element, of a clutch for driving said element, means to cause said clutch to be engaged and disengaged, a brake comprising a stationary annular brake member, an internal expanding brake member situated within the stationary brake member and rotating with the driven element, and means operative automatically when the clutch is disengaged to expand the expanding brake member into frictional contact with the stationary brake member, said means operating with greater or less force depending on the speed of rotation of the shaft.

7. In a device of the class described, the combination with a driven shaft, of a driving clutch member thereon provided with a clutch flange, an expanding clutch member rotatable with the shaft, a toggle lever connecting the ends of said expanding clutch member, a rock-shaft carried by said clutch member and having a finger to engage said toggle lever, and means to turn said shaft thereby to operate the toggle lever and cause it to expand the clutch member into frictional engagement with the clutch flange.

8. In a device of the class described, the combination with a driven shaft, of a driving clutch member thereon provided with a clutch flange, a clutch disk splined to the shaft, an inside expanding clutch member connected to said disk to rotate therewith while permitting the disk to move relative thereto longitudinally of the shaft, a toggle lever connecting the ends of said clutch member, a rock shaft carried by the clutch member and having a finger to engage the toggle lever, and arms extending from said rock shaft and engaging said clutch disk whereby movement of the clutch disk will operate the toggle lever to expand the clutch member.

9. In a stop motion, the combination with a driven element, of a clutch for driving said element, means to cause said clutch to be engaged and disengaged, a brake comprising a stationary annular brake member, an internal expanding brake member situated within the stationary brake member and rotating with the driven element, and means operative only when the clutch is disengaged to expand the expanding brake member into frictional contact with the stationary brake member.

10. In a stop motion, the combination with a driven element, of a clutch for driving said element, means to cause said clutch to be engaged and disengaged, a brake comprising a stationary annular brake member, an internal expanding brake member situated within the stationary brake member and rotating with the driven element, means tending to expand said expanding brake member into frictional contact with the stationary brake member while the driven member is rotating, and means to prevent said last-named means from becoming operative except when the clutch is disengaged.

11. In a stop motion, the combination with a driven element, of a clutch for driving said element, means to cause said clutch to be engaged and disengaged, a brake comprising a stationary annular brake member, an internal expanding brake member situated within the stationary brake member and rotating with the driven element, a centrifugally-operated device tending to expand said expanding brake member into frictional contact with the stationary brake member when the driven element is rotated, and means to prevent said device from becoming operative except when the clutch is disengaged.

In testimony whereof, I have signed my name to this specification.

FRANKLIN A. REECE.

Copies of this patent may be obtained for five cents each, by addressing the "Commissioner of Patents, Washington, D. C."